United States Patent
Gupta et al.

(10) Patent No.: US 9,775,182 B2
(45) Date of Patent: *Sep. 26, 2017

(54) WIRELESS PROVISIONING A DEVICE FOR A NETWORK USING A SOFT ACCESS POINT

(71) Applicant: Microsoft Technology Licensing, LLC, Redmond, WA (US)

(72) Inventors: Yatharth Gupta, Kirkland, WA (US); David A. Roberts, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/298,029

(22) Filed: Oct. 19, 2016

(65) Prior Publication Data

US 2017/0041967 A1 Feb. 9, 2017

Related U.S. Application Data

(63) Continuation of application No. 14/148,735, filed on Jan. 7, 2014, now Pat. No. 9,504,070, which is a
(Continued)

(51) Int. Cl.
*H04W 4/00* (2009.01)
*H04W 76/02* (2009.01)
(Continued)

(52) U.S. Cl.
CPC ......... *H04W 76/02* (2013.01); *H04L 12/2807* (2013.01); *H04L 67/306* (2013.01);
(Continued)

(58) Field of Classification Search
CPC .............................. H04W 76/02; H04W 84/12
See application file for complete search history.

(56) References Cited

U.S. PATENT DOCUMENTS 7,035,281 B1 4/2006 Spearman et al.
7,212,837 B1 5/2007 Calhoun et al.
(Continued)

FOREIGN PATENT DOCUMENTS

WO 2004031488 A 4/2004

OTHER PUBLICATIONS

Business Services Industry; "PCTEL Unveils Soft Access Point for Wi-Fi Networks; Segue SAM Disrupts Current Price Points for Wi-Fi Networks;" pp. 1-6; (2003); (printed Nov. 3, 2008).
(Continued)

*Primary Examiner* — Michael J Moore, Jr.
(74) *Attorney, Agent, or Firm* — Davin Chin; Chin IP, PLLC

(57) ABSTRACT

A computing device for provisioning a wireless device for connection to a wireless network via a legacy access point. The wireless device supports a wireless protected setup protocol for obtaining the network profile of the network. A user requests the computing device discover wireless devices for provisioning. In response to the user input, the computing device is configured as a soft access point and broadcasts a beacon signal indicating that the access point supports a wireless protected setup protocol, such as Wi-Fi Protected Setup. A request for provisioning is then received by the computing device from the wireless device. A network profile is transmitted from the computing device to the wireless device in accordance with the wireless protected setup protocol. The wireless device may use the profile to connect to the network via the legacy access point using the network profile.

20 Claims, 9 Drawing Sheets

Related U.S. Application Data continuation of application No. 12/347,440, filed on Dec. 31, 2008, now Pat. No. 8,625,552.

(51) Int. Cl.
| | |
|---|---|
| *H04W 48/10* | (2009.01) |
| *H04W 48/20* | (2009.01) |
| *H04L 12/28* | (2006.01) |
| *H04W 48/16* | (2009.01) |
| *H04L 29/08* | (2006.01) |
| *H04W 84/12* | (2009.01) |

(52) U.S. Cl.
CPC .......... *H04W 48/10* (2013.01); *H04W 48/16* (2013.01); *H04W 48/20* (2013.01); *H04W 84/12* (2013.01)

(56) References Cited

U.S. PATENT DOCUMENTS

| | | |
|---|---|---|
| 7,277,547 B1 | 10/2007 | Delker et al. |
| 7,385,960 B2 | 6/2008 | Bansal et al. |
| 7,974,236 B2 | 7/2011 | Woo |
| 7,986,642 B2 | 7/2011 | Ishimoto |
| 8,000,276 B2 | 8/2011 | Scherzer et al. |
| 8,199,699 B2 | 6/2012 | Woo |
| 8,327,143 B2 | 12/2012 | Ilyadis |
| 2006/0209773 A1 | 9/2006 | Hundal et al. |
| 2007/0140188 A1 | 6/2007 | Melkote et al. |
| 2007/0157295 A1 | 7/2007 | Mangalore et al. |
| 2007/0208937 A1 | 9/2007 | Cam-Winget et al. |
| 2008/0086760 A1 | 4/2008 | Jiang et al. |
| 2008/0205339 A1 | 8/2008 | Brophy |
| 2008/0205340 A1 | 8/2008 | Meylan et al. |
| 2009/0059878 A1 | 3/2009 | Tamura |
| 2009/0109897 A1 | 4/2009 | Woo |
| 2009/0213824 A1 | 8/2009 | Chen |
| 2010/0020746 A1 | 1/2010 | Zaks |
| 2010/0115278 A1 | 5/2010 | Shen et al. |
| 2010/0157960 A1 | 6/2010 | Banerjee et al. |

OTHER PUBLICATIONS

Kankaanpaa; "Candidate Access Router Discovery;" Helsinki Univ. of Tech.; pp. 1-10; (2003).

Marvell; "Soft AP Solutions;" 1 page; (2008); (printed Nov. 3, 2008).

Microsoft; "Wireless Provisioning Services (WPS) Authoring Tool;" 1 page; (2008); (printed Nov. 3, 2008).

Nair; "Easier Home Wi-Fi Networking Using Soft Access and Routing Points;" pp. 1-2; (2004); (printed Nov. 3, 2008).

"Final Office Action Issued in U.S. Appl. No. 12/347,440", dated Sep. 15, 2010, 17 Pages.

"Non Final Office Action Issued in U.S. Appl. No. 12/347,440", dated Apr. 3, 2013, 18 Pages.

"Non Final Office Action Issued in U.S. Appl. No. 12/347,440", dated Apr. 15, 2010, 17 Pages.

"Notice of Allowance Issued in U.S. Appl. No. 12/347,440", dated Sep. 5, 2013, 9 Pages.

"Final Office Action Issued in U.S. Appl. No. 14/148,735", dated Oct. 29, 2015, 18 Pages.

"Non Final Office Action Issued in U.S. Appl. No. 14/148,735", dated Mar. 9, 2016, 9 Pages.

"Non Final Office Action Issued in U.S. Appl. No. 14/148,735", dated May 5, 2015, 18 Pages.

"Notice of Allowance Issued in U.S. Appl. No. 14/148,735", dated Jul. 19, 2016, 5 Pages.

ately provisioning the wrong device or a malicious attack. For example, a user may be prompted to enter a PIN associated with a selected wireless device.

WIRELESS PROVISIONING A DEVICE FOR A NETWORK USING A SOFT ACCESS POINT

CROSS-REFERENCE TO RELATED APPLICATION(S)

This application is a continuation of U.S. patent application Ser. No. 14/148,735, filed Jan. 7, 2014, entitled "WIRELESS PROVISIONING A DEVICE FOR A NETWORK USING A SOFT ACCESS POINT", which is a continuation of U.S. patent application Ser. No. 12/347,440, filed Dec. 31, 2008, now U.S. Pat. No. 8,625,552, entitled "WIRELESS PROVISIONING A DEVICE FOR A NETWORK USING A SOFT ACCESS POINT". The entirety of these aforementioned applications are incorporated herein by reference.

BACKGROUND

Many types of devices are configured to support communication over a wireless network. Some wireless networks are configured as managed or infrastructure networks, using an access point to control communications between devices on the network.

When a user wishes to add a new device to a wireless network, she must first obtain a profile for the network and provide the profile to the device. The network profile is used by the device to identify the network and perform functions such as authentication and encryption in a manner recognized by the network. The network profile may be obtained in a number of ways. For example, the new device may be wired to another device that stores the network profile and the profile may be copied over the wire. Alternatively, the network profile may be stored on a portable computer-readable medium, such as a USB flash drive or compact disc, and then loaded onto the wireless device. The network profile also may be entered manually through a keypad or other input device. In yet another way, the network profile may be obtained using wireless communication with a network access port that supports a wireless protected setup protocol.

A wireless protected setup protocol, also known as a wireless provisioning technology, permits secure wireless transmission of the network profile to a wireless device. Wi-Fi Protected Setup is an example of a wireless protected setup protocol used on Wi-Fi networks. In an infrastructure network, the network profile may be transmitted wirelessly when the receiving wireless device and the supplying access point both support the wireless protected setup protocol. However, not all access points support a wireless protected setup protocol. WiMedia Association Model is another example of a protected setup protocol used for a peer-to-peer exchange of setup date in ultra-wideband (UWB) networks.

SUMMARY

The usability of wireless connections may be expanded by facilitating wireless provisioning of devices even in networks with access points that do not support wireless provisioning protocols. To provision a wireless device, a computing device connected to the network is configured as an access point that is capable of performing a wireless provisioning protocol. This "soft AP" can perform a wireless protected setup under which the network profile for the network is transmitted to the wireless device.

The setup process performed by the soft AP may include broadcasting a beacon signal including an indication that the soft AP supports a specific wireless provisioning protocol, such as standard protocols under which many wireless devices are designed to operate under.

Once the wireless device obtains the network profile from the soft AP, it can then connect to the network through a "hard AP" using the profile. The "soft AP" also can be configured as a network client, allowing the computing device serving as the soft AP to access the wireless device over the network.

The computing device may be triggered to operate in accordance with the provisioning protocol by a user of the computing device indicating that the user wishes to connect to a wireless device that is not on the network. The computing device may contain a user experience module that guides a user through the process of commanding the computing device to obtain the network profile, configure it as a soft AP, identify un-provisioned wireless devices, provision a selected wireless device and then connect to that device. The user interface may also prompt the user to verify the device to be provisioned to prevent accidentally provisioning the wrong device or a malicious attack. For example, a user may be prompted to enter a PIN associated with a selected wireless device.

In scenarios in which the computing device is already connected to the network, it may already have the network profile. Accordingly, obtaining the network profile for use by the soft AP, in some scenarios, may simply involve reading the profile from a profile store on the computing device.

As a result of the provisioning process, the wireless device can use the network profile to connect to the network via a legacy access point or other access point that does not support a wireless provisioning protocol supported by the wireless device. Though use of the provisioning process is not limited to any specific scenario, it may provide an improved user experience particularly for users of portable electronic devices that may move from wireless network to wireless network and therefore need to be reprovisioned frequently or purchasers of wireless devices that expect their devices to seamlessly integrate with an existing network.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

The inventors have recognized and appreciated that though wireless protected setup protocols were developed to facilitate the use of wireless communication, the use of wireless technology is limited because many networks do not have access points that support the protocols. In this scenario, rather than delivering an intended seamless integration of a wireless device into a network, a frustrating user experience may result. For example, users may wish to provision a wireless device wirelessly for a network that uses a legacy access point without replacing the access point. The legacy access point may not support a wireless protected setup protocol that is also supported by the wireless device or, as protocols evolve, may only support an older version of a protocol that is not supported by the wireless device.

Figure 1A:
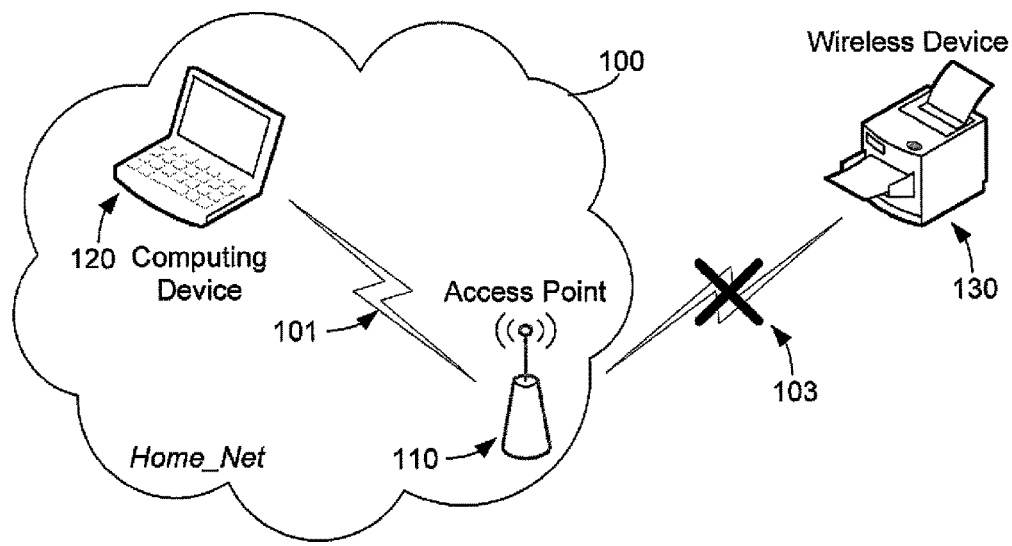
FIG. 1A illustrates a network including an access point and a computing device, and a wireless device outside the network unable to be wirelessly provisioned by the access point.

An example of this situation is illustrated in FIG. 1A, which shows a wireless network 100, Home Net, with an access point 110. Access point 110 is sometimes called a "hard AP" for the wireless network 100. Computing device 120 is a member of the wireless network 100 and is connected to access point 110 via wireless connection 101.

A wireless device 130, lacking a network profile for the network 100, is unable to form a wireless connection 103, and join the network 100. The wireless device 130 supports a wireless protected setup protocol, yet cannot obtain the network profile from the access point 110, which is a legacy device lacking support for the protocol.

Figure 1B:
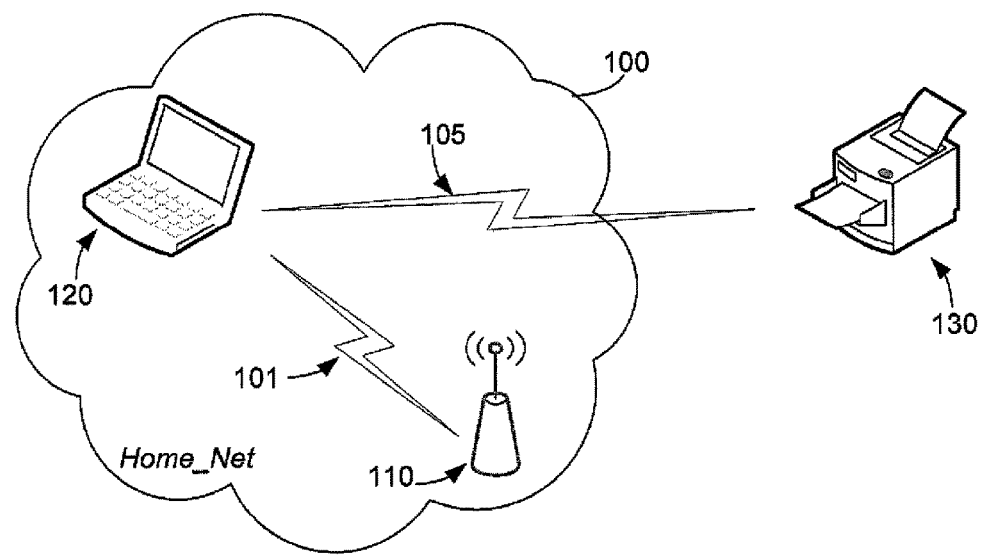
FIG. 1B illustrates a computing device configured as a soft access point communicating with a wireless device to provision the wireless device.

The inventors have recognized and appreciated that the network profile may be wirelessly communicated to the wireless device 130 by configuring the computing device 120 as an access point supporting the wireless protected setup protocol. In some embodiments, the computing device 120 is configured as a soft access point ("soft AP") and broadcasts a signal indicating support for the wireless protected setup protocol. The wireless device 130 receives this signal and transmits a request for provisioning back to the computing device 120. As shown in FIG. 1B, a wireless connection 105 is formed between the computing device 120 and the wireless device 130 so that the computing device 120 may transmit the network profile for the network 100 to the wireless device 130.

Figure 1C:
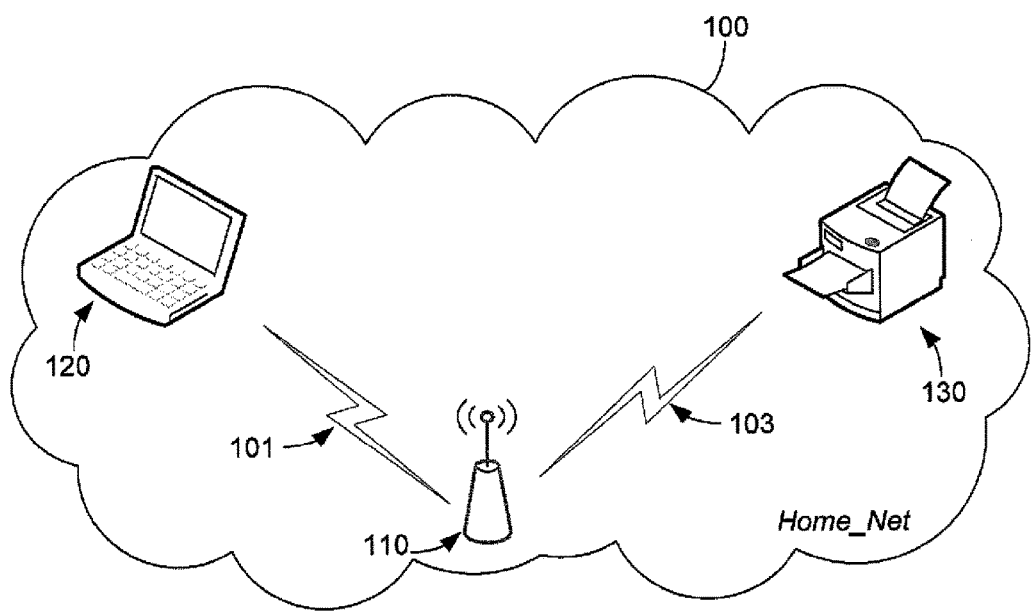
FIG. 1C illustrates a provisioned wireless device communicating with an access point as part of a network.

Once the network profile has been successfully transmitted to the wireless device 130, the wireless device 130 may use the profile to join the network 100 by forming the wireless connection 103 with the access point 120 as shown in FIG. 1C.

Figure 2:
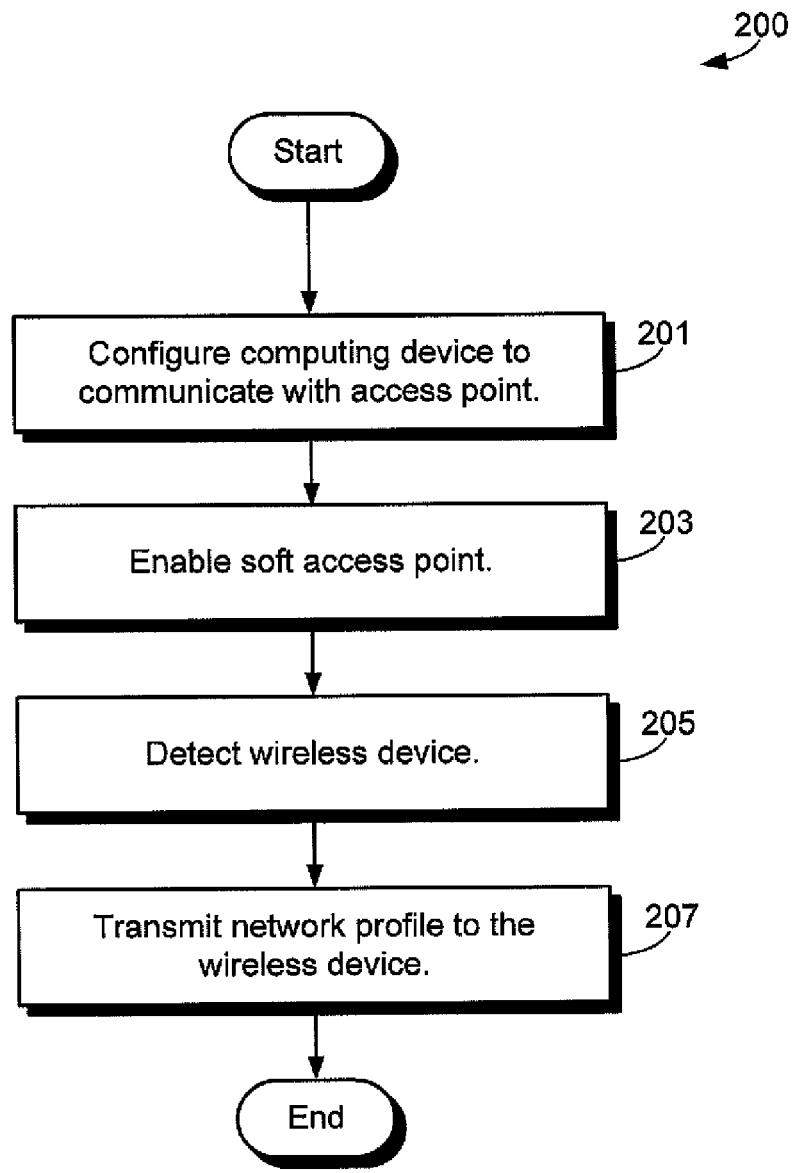
FIG. 2 is a flow diagram of a method of operating a computing device to provision a wireless device for connection to a network via a first access point.

FIG. 2 shows a method 200 of operating the computing device 120 (FIG. 1A) for provisioning the wireless device 130 to connect to a wireless network 100 via an access point 110.

At step 201, the computing device 120 is configured to connect to the network 100 via the access point 110. The computing device may be configured to connect to the network 100 by obtaining the network profile for the network. The network profile may be obtained in any suitable way. In some embodiments, the computing device is used to configure the access point and obtains the network profile at the time the network 100 is set up.

At step 203, the computing device 120 is configured as a "soft" access point. In some embodiments, the soft access point is enabled by a combination of software and hardware. For example, software modules may control a network interface to function as an access point. The term soft is used to differentiate this access point from the "hard" access point 110 of the infrastructure network 100 or to designate a device that may be selectively controlled to operate as an access point for provisioning. The soft access point may broadcast a wireless signal including an indication that the soft access point supports a wireless protected setup protocol.

At step 205, a wireless device 130 is detected. In some embodiments, the wireless device is detected because it transmits a request for provisioning to the computing device 120.

At step 207, the computing device 120 transmits the network profile to the wireless device 130 in accordance with the wireless protected setup protocol. Once the network profile has been transmitted to the wireless device 130, the soft access point on the computing device 120 may be deactivated.

Figure 3:
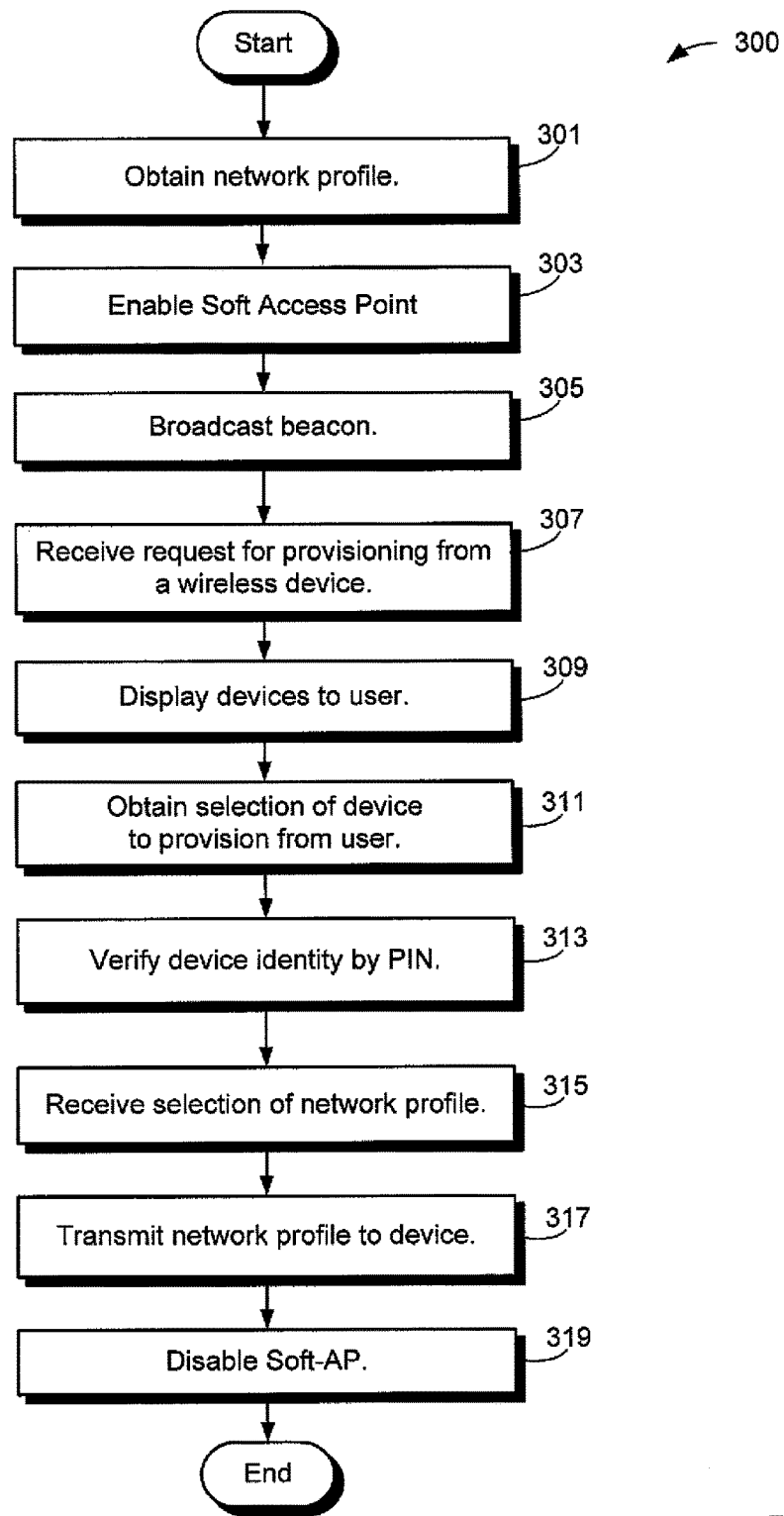
FIG. 3 is flow diagram of another method of operating a computing device to provision a wireless device for connection to a network via a first access point.

FIG. 3 shows a method 300 for provisioning a wireless device. Some of the steps of method 300 may be performed similarly as in one or more of the steps in method 200 (FIG. 2). Method 300 may be performed by a computing device, such as computing device 120, that may be configured as a soft access point.

At step 301, a network profile is obtained. A network profile contains information for connection to a corresponding wireless network. The network profile may specify, for example, a network name, authentication type, encryption type, and encryption key. Other information may also be present in a network profile. Also, some of these specifications may be absent in some network profiles and present in others.

For example, in a network profile for IEEE 802.11 compliant networks (e.g., Wi-Fi), the network name is the service set identifier or SSID. Authentication types may include open (i.e., no authentication), shared, Wi-Fi Protected Access (WPA and WPA2), and Wi-Fi Protected Access in pre-shared key (PSK) mode (WPA-PSK and WPA2-PSK). In open or shared mode, encryption may be performed, for example, in accordance with the Wired Equivalent Privacy (WEP) which may require the joining device have a network key. If Wi-Fi Protected Access is used for authentication (WPA, WPA2, WPA-PSK, and WPA2-PSK), encryption may be in performed in compliance with the temporal key integrity protocol (TKIP) or the advanced encryption standard (AES). This list is illustrative of some of the options available for IEEE 802.11 type networks and is not intended to be exhaustive.

The network profile may be obtained in any suitable way and may be stored in a profile store of a computing device. In some embodiments, the network profile is obtained from a file stored on a computer-readable medium such as a USB flash drive or compact disc. The network profile may be transmitted to the computing device over a wired connection such as a wired network, USB connection, or IEEE 1394 cable. The network profile may be entered manually, for example, through a keypad or other input device. The network profile may be transmitted wirelessly using a wireless protected setup protocol or through another wireless network connection. In some embodiments, the computing device is used to form a wireless network by configuring an access point. The network profile for the network may thus be defined and obtained during setup of the access point. In some embodiments, multiple network profiles are obtained. It should be appreciated that obtaining a network profile does not require that a connection ever be formed to the corresponding wireless network.

At step 303, a soft access point is enabled. Enabling the soft access point may comprise configuring the computing device to act as an access point. The soft access point may create a network different from any of the networks profiled in step 301. The computing device may enable multiple soft access points, each for a different wireless communications technology. In some embodiments, the computing device is configured as a soft access point in response to a user input. The user input, may for example, indicate the user wishes to discover a wireless device for provisioning to a wireless network. In some embodiments, the computing device maintains a connection to one or more networks while the soft access point is enabled. Though in other embodiments, the computing device may disconnect from the network while acting as soft access point. If the computing device disconnects from the network, it may reconnect after the method 300 is completed. The network connection may be to the same type of network as the network created by the soft access point. For example, both the soft access point and the wireless network connection may be IEEE 802.11 compliant.

At step 305, in some embodiments, the soft access point broadcasts a signal, using a suitable network interface, indicating that computing device is configured as an access point. Such a signal may be a beacon signal. Signals may be sent for each wireless communication technology for which an access point was enabled in step 303. The signal may include an indication that the access point supports a suitable wireless protected setup protocol. A suitable wireless protected setup protocol may depend on the type of network the soft access point is configured for. In some embodiments, the soft access point is an IEEE 802.11 compliant access point, such as a Wi-Fi access point.

Accordingly, the signal may include an indication that the access point supports Wi-Fi Protected Setup or any other suitable wireless protected setup protocol for use on an IEEE 802.11 wireless network. In some other embodiments, the computing device may be configured for ultra-wideband (UWB) communication. Accordingly, the signal may include an indication that protected setup in compliance with the WiMedia Association Model or another suitable wireless protected setup protocol is supported.

At step 307, the computing device waits to receive a request for provisioning from a wireless device. Any suitable method may be used to determine how long to wait before continuing to step 309. In some embodiments, the computing device waits a predetermined period of time. In some embodiments, the computing device waits until it receives a request. In some embodiments, a wait time is reset each time a new request is received and expires when no further requests have been received and the wait time expires. In some embodiments, the broadcast signal may be repeated (step 305) while performing step 307. Also, in some embodiments, information may be exchanged a priori to the process 300 being performed, Exchanged information may include a device identification and PIN for a device to be provisioned. This information may be exchanged, for example using a card reader and RFID token or other suitable near field communication mechanism. In such embodiments, the computing device may not wait at all for an explicit request from a device to be provisioned at block 307. Exactly how it is determined to proceed to step 309 is not critical to the invention.

Figure 4A:
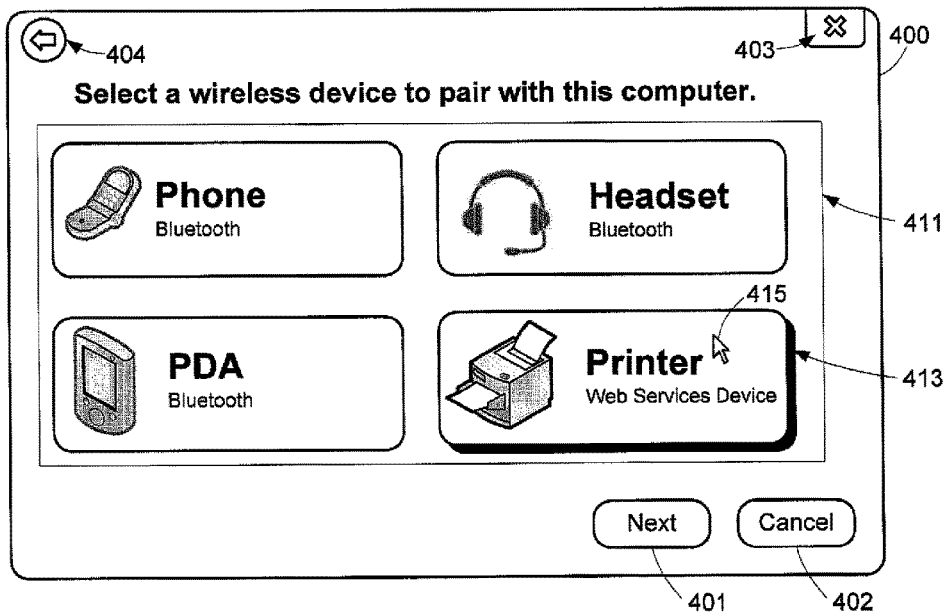
FIGS. 4A-4G illustrate a user interface for controlling provisioning of wireless devices.

At step 309, indications of the wireless devices from which a request was received in step 307 are provided to the user. In some embodiments, the method 300 is aborted at step 309 if no requests were received during step 307. In some embodiments, the wireless devices requesting provisioning are presented in a user interface on a display, for example, as is shown in the user interface 400 in FIG. 4A. In this example, user interface 400 provides indications 411 of the wireless devices requesting provisioning are displayed.

At step 311, a selection of a wireless device to provision is received. In some embodiments, steps 307 and 309 and performed simultaneously, with the wireless device for each new request being presented to the user in real-time, until the selection at step 311 is received. In some embodiments, a user selects a wireless device through a user interface in which all detected devices are indicated. For example, in user interface 400 (FIG. 4A), a user may navigate a cursor 415 over a wireless device 413 to select it. In this example, once selected, the user may confirm the selection by similarly selecting the "Next" button 401. Also shown are interface buttons such as a previous screen button 404 for returning to a previous screen, a "Cancel" button 402 and close button 403 for aborting the method 300. However, any suitable user interface may be used to receive a user indication that a device should be provisioned for connection to a network.

Figure 4B:
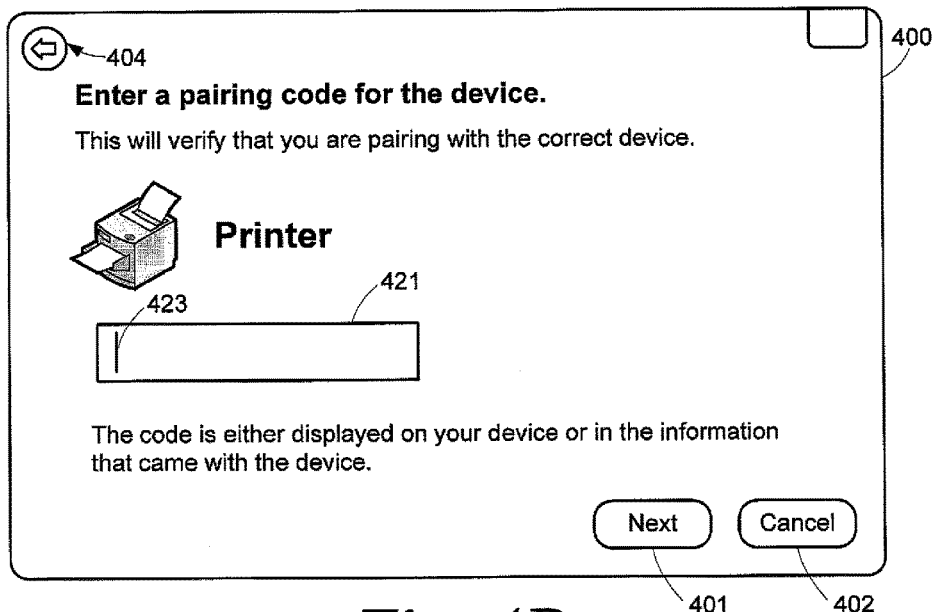
Figure 4C:
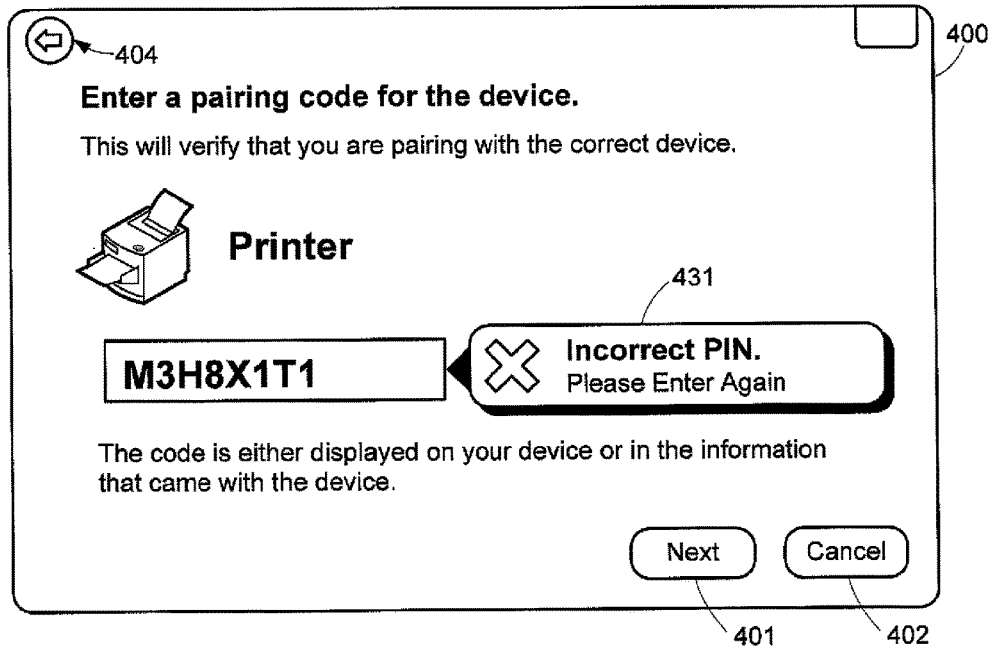

Returning to FIG. 3, the illustrated method 300 may include steps that verify that the user has selected a desired device. At step 313, the identity of the selected wireless device may be verified. This insures that the device intended for provisioning by the user corresponds to the selected wireless device. In some embodiments, verification is performed by using an identification string for the device, such as a PIN. The user may be prompted to enter a PIN that may be, for example, provided on a display of the wireless device, printed on the wireless device, or provided in materials accompanying the wireless device. FIG. 4B illustrates an example embodiment, in which the user interface 400 prompts a user to enter a "pairing code" or PIN for the device into the text box 421. The user may use a keypad or other input device to produce characters in the text box according to the position of a cursor 423. If the PIN entered by the user fails to correspond with the selected wireless device, the user may have incorrectly entered the PIN or the wireless devices selected by the user at step 311 is not the wireless device the user intends to provision. FIG. 4C illustrates an example embodiment in which the user interface 400 provides an indication 431 that the PIN is incorrect. The user is prompted to re-enter the PIN, or may return to select another device for provisioning.

Figure 4D:
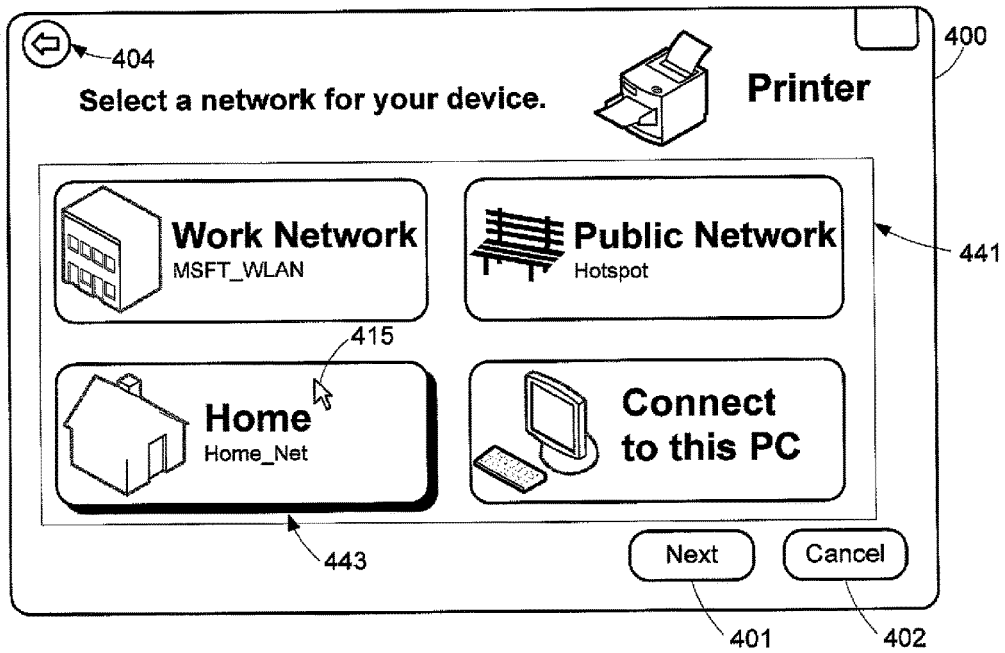

At step 315, a network selection for the selected wireless device is received. In some embodiments, available networks are presented to a user and a network is selected by a user input. The network may be chosen from among those for which network profiles were obtained in step 301. For example, the network profile database may be read to obtain a listing of available network profiles. In some embodiments, only networks which the wireless device is capable of connecting to are available for selection. For example, a device only capable of connecting to IEEE 802.11 type networks, Ultra-Wide band (UWB) networks in the network profile database may not be presented. In some embodiments, multiple networks may be selected and connection preferences set. For example, a connection order may be specified. In some embodiments, if no such profiles exist or as an additional option, the user may be prompted to manually enter a profile or obtain it from another medium. Yet in some other embodiments, a network interface of the computing device scans for networks and includes the discovered networks as options for the user. If a network for which no network profile exists in the network profile database is selected, the user may be prompted to provide a network profile. FIG. 4D illustrates an example embodiment in which the user interface 400 provides indications 441 of networks with available profiles. The user may use the cursor 415 to indicate a selected network 443.

At step 317, the network profile for the selected network is transmitted to the wireless device. The network profile may be transmitted in accordance with a wireless protected setup protocol supported by the wireless device and the computing device. The wireless protected setup protocol may encrypt at least a portion of the network profile for secure transmission to the wireless device. For example, if the network profile is transmitted over a Wi-Fi connection between the devices, the network profile may be transmitted in accordance with the Wi-Fi Protected Setup standard.

Figure 4E:
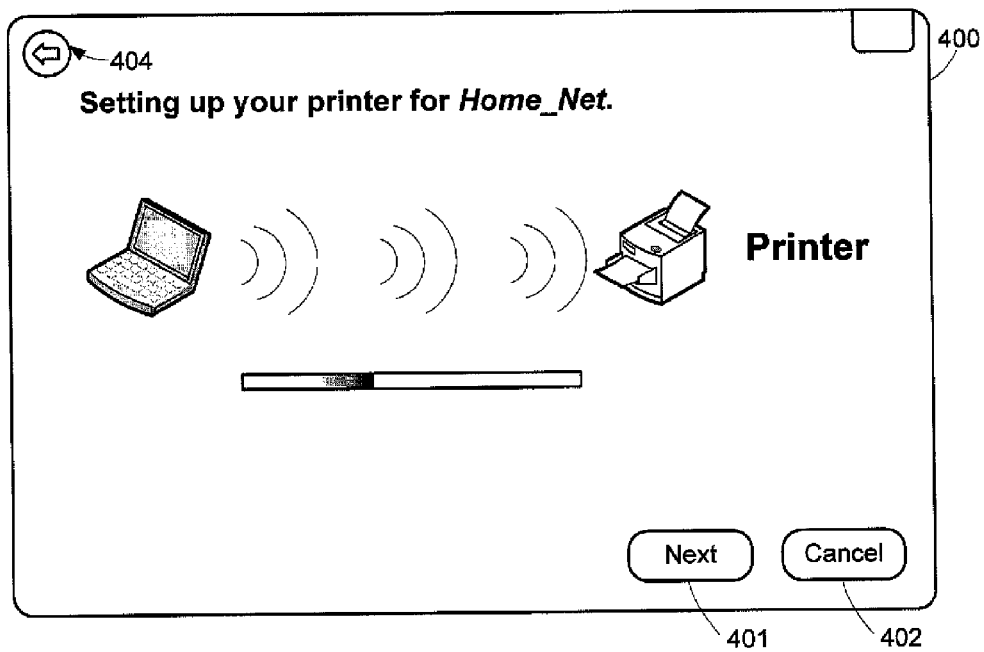

According to the Wi-Fi Protected Setup standard at least a portion of the network profile may be encrypted using an encryption protocol, such as Extensible Authentication Protocol (EAP) for transmission to the wireless device. In some embodiments, multiple network profiles may be transmitted, optionally with rules for selecting a network. FIG. 4E illustrates an example embodiment in which user interface 400 indicates that the network profile is being transmitted to the wireless device.

Figure 4F:
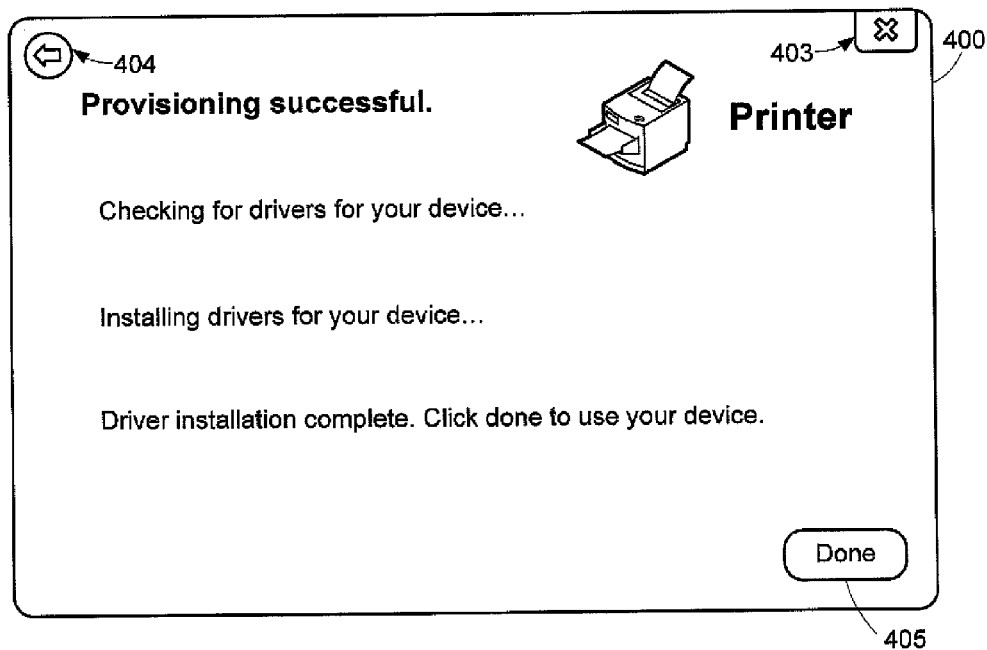

In some embodiments, the computing device confirms that the transmission was successful. For example, the computing device may attempt to identify the wireless device on the network for which the network profile was sent. That is, the computing device may connect to the network for which the wireless device was provisioned, if not already connected, and attempt to communicate with the wireless device over that network. In some embodiments, the wireless device may provide a confirmation that the transmission was successful. If the transmission was successful, the user interface 400 may provide an indication of the success, such as that shown in FIG. 4F. Optionally, the computing device may be configured to utilize a service of the wireless device. For example, a printer driver may be installed when the wireless device is a printer. The user interface may be closed using the close button 403 or the "Done" button 405.

Figure 4G:
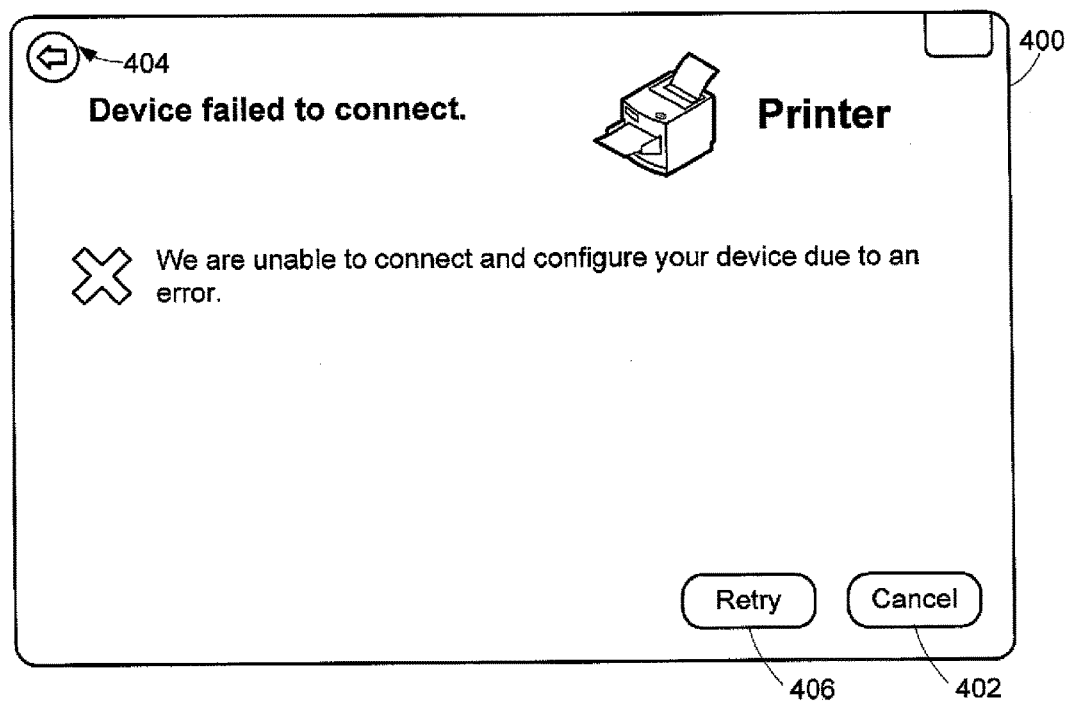

If the transmission of the network profile fails, an error may be indicated to the user. In some embodiments, reasons for the error and/or steps for resolving the error may be suggested to the user. FIG. 4G illustrates a user interface 400 that may be shown when the transmission fails. User interface 400 provides a "Retry" button 406 for repeating the attempt to transmit the network profile.

At step 319, the soft access point may be deactivated. Optionally, the user may be prompted to indicate if they would like to provision more wireless devices before deactivating the soft access point.

Figure 5:
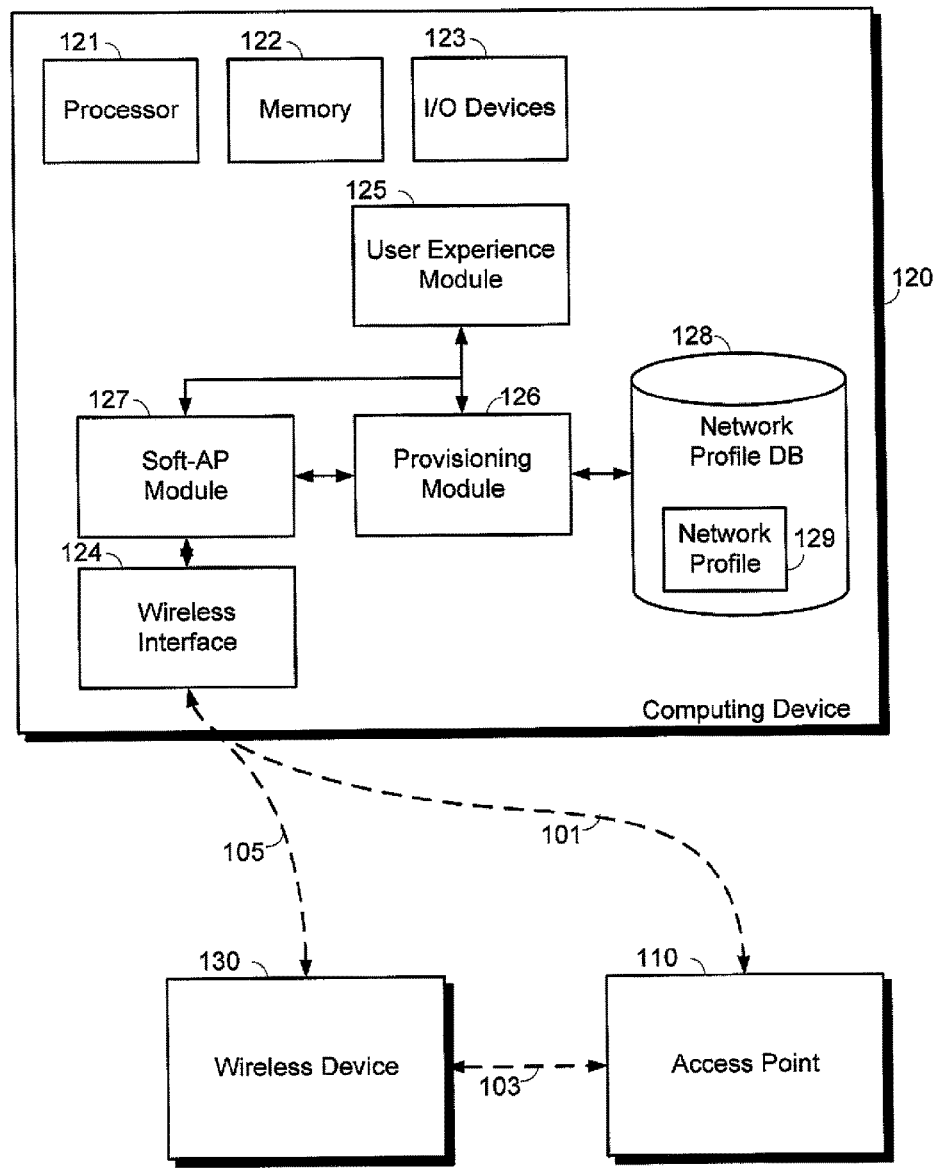
FIG. 5 is a block diagram of a computing device, access point, and wireless device.

The computing device configured as a soft AP may be any suitable form. However, as an example, FIG. 5 is a block diagram of the computing device 120 according to some embodiments. Also shown are the access point 110 and the wireless device 130. Computing device 120 and wireless device 130 may be any suitable type of computing device. Computing device 120 and wireless device 130 may be, for example and not limitation, any of a personal computer, laptop, tablet PC, personal digital assistant (PDA), mobile phone, a peripheral device, printer, headset, mobile phone, display, television, camera, input device, output device, or any other type of device or combination thereof configured to control a radio for wireless communication.

In some embodiments, the computing device 120 comprises a processor 121, memory 122, input/output (I/O) devices 123, and a wireless interface 124.

Processor 121 may be a processor as are known in the art or any suitable processing device. For example and not limitation, processor 121 may be a central processing unit (CPU), digital signal processor (DSP), controller, addressable controller, general or special purpose microprocessor, microcontroller, addressable microprocessor, programmable processor, programmable controller, dedicated processor, dedicated controller, or any other suitable processing device.

Memory 122 may store data and/or software modules that when executed by processor 121 perform a desired function. Memory 122 may be a computer-readable storage medium as are known in the art or any suitable type of computer-readable storage medium. For example and not limitation, memory 122 may be RAM, a nanotechnology-based memory, one or more floppy discs, compact discs, optical discs, volatile and non-volatile memory devices, magnetic tapes, flash memories, hard disk drive, circuit configurations in Field Programmable Gate Arrays, other semiconductor devices, or other tangible computer storage medium or combination thereof.

I/O devices 123 may include any type of I/O device as are known in the art and/or any suitable I/O device for providing and/or receiving information. I/O devices 123 may include, for example and not limitation, a keypad such as a keyboard, pointing device such as a mouse or trackball, microphone, joystick, touch screen display, display, speaker, or a combination thereof.

Wireless interface 124 may receive and transmit information wirelessly to and from the computing device. Wireless interface 124 may be any wireless interface known in the art or any suitable wireless interface. The wireless interface may be compatible with any wireless communications protocol. The wireless interface 124 may be compatible with any standard or proprietary communications protocol, such as those for wireless personal area network (WPAN), wireless local area network (WLAN), wireless local area network (WLAN), wireless metropolitan area networks (wireless MAN), wireless wide area network (WWAN), or other types of networks. The wireless interface 124 may, for example and not limitation, be compatible with any of IEEE 802.11, Wi-Fi, ultra-wide band (UWB) technologies, Bluetooth, Wireless USB, WiMedia, WiMax, or Wireless 1394.

The computing device 120 may include a network profile database 128.

The network profile database may use memory 122 to store network profiles including network profile 129.

The computing device 120 may also include a number of modules configured to perform a specific function. In the illustrated embodiment, the computing device 120 includes a user experience module 125, a provisioning module 126, and a soft access point module 127. Modules may be implemented in hardware, software, or any suitable combination thereof. In some embodiments, a module may comprise computer-executable instructions. The instructions may be stored in memory 122 and executed by processor 121.

Computing device 120 may be configured to perform a method of provisioning a wireless device 130 for connection to a wireless network via an access point 110. In some embodiments, the computing device is configured to perform method 200 (FIG. 2) and/or method 300 (FIG. 3). For example, the user experience module 125, provisioning module 126, and soft access point module 127 may be configured to control the computing device 120 to perform aspects of an appropriate method. In some embodiments, the modules may be configured to perform steps of method 200 and/or 300 in any suitable way. The modules may be coded using known user interface techniques and known programming techniques to configure the computing device 120 to perform wireless communication.

In some embodiments, the user experience module 125, in response to a user input, activates the soft access point module 127. The soft access point module 127, once activated, controls the wireless interface 124 to transmit a signal indicating the computing device is configured as an access point supporting a wireless protected setup protocol.

The soft access point module 127 then waits to receive requests for provisioning through the wireless interface from wireless devices such as wireless device 130. The user experience module 125 may present these requests to the user through one of the I/O devices 123, such as a display.

The presentation may prompt a user to select a wireless device for provisioning. When a user selects wireless device 130 for provisioning, the user experience module 125 then prompts the user to select a network for the device. The user experience module may obtain networks for which the network profile is known from the provisioning module 126. The provisioning module 126 may obtain network profiles from the network profile database 128. Once a network is selected, for example, by user input, the provisioning module 126 provides the corresponding network profile 129 to the soft access point module 127. The soft access point module 127 controls the wireless interface 124 to transmit the network profile 129 to the wireless device 130 in accordance with a wireless protected setup protocol over wireless connection 105.

The wireless device 130 may use the network profile to form a wireless connection 103 with the access point 110 for the wireless network corresponding to the network profile 129.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A computing device, comprising:
a memory and a processor, wherein the memory and the processor are respectively configured to store and execute instructions for performing operations, the operations comprising:
receiving a request to connect a first device to a hardware-based access point;
in response to the request, enabling a soft access point, the soft access point being implemented on a separate device than the hardware-based access point;
broadcasting an indication of network availability of the soft access point;
receiving, by the soft access point, a connection request; and
transmitting a network profile for connecting to the hardware-based access point from the soft access point.

2. The computing device of claim 1, wherein the operations further comprise:
receiving configuration information for the first device via a user interface.

3. The computing device of claim 2, wherein the configuration information includes at least one of the network profile or security information for the first device.

4. The computing device of claim 1, wherein the soft access point and the hardware-based access point are IEEE 802.11 compliant.

5. The computing device of claim 1, wherein the network profile is communicated in compliance with a Wi-Fi Protected Setup standard.

6. The computing device of claim 1, wherein the network profile comprises a name of a network associated with the hardware-based access point, an encryption type for the network, and an authentication type for the network.

7. A computer-readable memory having instructions stored therein for performing operations to connect a first device to a first access point, the operations comprising:
receiving a request to connect the first device to the first access point;
configuring a soft access point in response to the request, the soft access point being on a separate device than the first access point;
broadcasting, from the soft access point, an indication that the soft access point is configured as an access point;
receiving, by the soft access point, a connection request; and
communicating a network profile for connecting the first device to the first access point from the soft access point.

8. The computer-readable memory of claim 7, wherein the soft access point is IEEE 802.11 compliant.

9. The computer-readable memory of claim 7, wherein the indication that the soft access point is configured as an access point includes an indication of support for a WiMedia Association Model.

10. The computer-readable memory of claim 7, wherein the user request is received in response to a presentation, via a user interface, of multiple devices requesting connection to the first access point.

11. The computer-readable memory of claim 7, wherein the user request is received via a user interface displayed on a computing device separate from the first device.

12. The computer-readable memory of claim 11, wherein the operations further comprise:
receiving security information for the first device via the user interface.

13. The computer-readable memory of claim 7, wherein the computing device on which the user interface is displayed is not on a same network as the first access point.

14. The computer-readable memory of claim 7, wherein the operations further comprise:
identifying a type of the first device.

15. A method for wireless communications, the method comprising:
in response to a request to connect a first device to a network, configuring a soft access point, the soft access point being separate from a first access point;
broadcasting, from the soft access point, an indication that the soft access point is configured to provide access point functionality to at least one other device;
receiving, by the soft access point, a connection request; and
transmitting a network profile usable to connect the first device to the first access point.

16. The method of claim 15, wherein the first access point is a hardware-based access point providing access to a network.

17. The method of claim 15, wherein the indication that the soft access point is configured to provide access point functionality includes an indication of support for a WiMedia Association Model.

18. The method of claim 15, further comprising:
receiving the user request, wherein the user request is also a request to connect the first device to the first access point.

19. The method of claim 15, wherein the indication that the soft access point is configured to provide access point functionality includes an IEEE 802.11 beacon.

20. The method of claim 15, wherein the soft access point is not connected to the first access point.

* * * * *